(12) United States Patent
Suarez et al.

(10) Patent No.: US 12,002,018 B2
(45) Date of Patent: Jun. 4, 2024

(54) DYNAMIC UNAUTHORIZED ACTIVITY DETECTION

(71) Applicant: Bank of America Corporation, Charlotte, NC (US)

(72) Inventors: Linda D. Suarez, Mesquite, TX (US); John Barrett Hall, Charlotte, NC (US); Darlene D. Meunier, New Douglas, IL (US); Linda B. Nipper, Concord, NC (US); James N. Reid, Schuyler, NY (US); Diana Horn, Hiram, GA (US)

(73) Assignee: Bank of America Corporation, Charlotte, NC (US)

( * ) Notice: Subject to any disclaimer, the term of this patent is extended or adjusted under 35 U.S.C. 154(b) by 77 days.

(21) Appl. No.: 17/182,961

(22) Filed: Feb. 23, 2021

(65) Prior Publication Data
US 2022/0270058 A1 Aug. 25, 2022

(51) Int. Cl.
*G06Q 20/04* (2012.01)
*G06N 20/00* (2019.01)
*G06Q 20/40* (2012.01)
*G06V 30/224* (2022.01)

(52) U.S. Cl.
CPC ......... *G06Q 20/0425* (2013.01); *G06N 20/00* (2019.01); *G06Q 20/4016* (2013.01); *G06V 30/2253* (2022.01)

(58) Field of Classification Search
CPC ........... G06Q 20/0425; G06Q 20/4016; G06N 20/00; G06V 30/40; G06V 30/10
USPC .......................................................... 705/44
See application file for complete search history.

(56) References Cited

U.S. PATENT DOCUMENTS

| | | |
|---|---|---|
| 6,669,086 B2 | 12/2003 | Abdi et al. |
| 7,257,246 B1 | 8/2007 | Brodie et al. |
| 7,347,362 B2 | 3/2008 | Michelassi et al. |
| 7,494,052 B1 | 2/2009 | Carpenter et al. |
| 7,980,463 B2 | 7/2011 | Epstein |
| 8,620,812 B2 | 12/2013 | Callahan et al. |
| 9,412,135 B2 * | 8/2016 | Smith .................. G06Q 20/023 |

(Continued)

FOREIGN PATENT DOCUMENTS

CA 2408078 C 9/2011

OTHER PUBLICATIONS

Breck et al. Data Validation for Machine Learning. Proceedings of the 2nd SysML Conference, Palo Alto, CA, USA, 2019. (Year: 2019).*

*Primary Examiner* — Virpi H Kanervo
(74) *Attorney, Agent, or Firm* — Banner & Witcoff, Ltd.

(57) ABSTRACT

Systems for dynamic unauthorized activity detection are provided. In some arrangements, issue data may be received from, for instance, a customer of an enterprise organization. The issue data may include a data file containing metadata associated with a plurality of checks written or issued by the customer. As those checks are cashed, the checks may be evaluated for potential unauthorized activity. Accordingly, check data and/or check image data may be received by the enterprise organization. The check and/or check image data, as well as the metadata, may be analyzed using machine learning to determine whether unauthorized or potential unauthorized activity has occurred. Based on the determination, one or more actions may be identified and executed.

15 Claims, 11 Drawing Sheets

(56) References Cited

U.S. PATENT DOCUMENTS

| | | | |
|---|---|---|---|
| 2002/0052852 A1* | 5/2002 | Bozeman | G06Q 20/04 |
| | | | 705/64 |
| 2003/0130949 A1* | 7/2003 | Ahles | G06Q 20/401 |
| | | | 705/45 |
| 2016/0063636 A1* | 3/2016 | Feimster | G06Q 40/08 |
| | | | 705/4 |
| 2019/0108417 A1* | 4/2019 | Talagala | G06N 5/04 |
| 2019/0370146 A1* | 12/2019 | Babu | G06F 16/24545 |
| 2020/0160286 A1* | 5/2020 | Vukich | G06Q 20/0425 |
| 2022/0129907 A1* | 4/2022 | Mustafi | G06Q 30/016 |

* cited by examiner

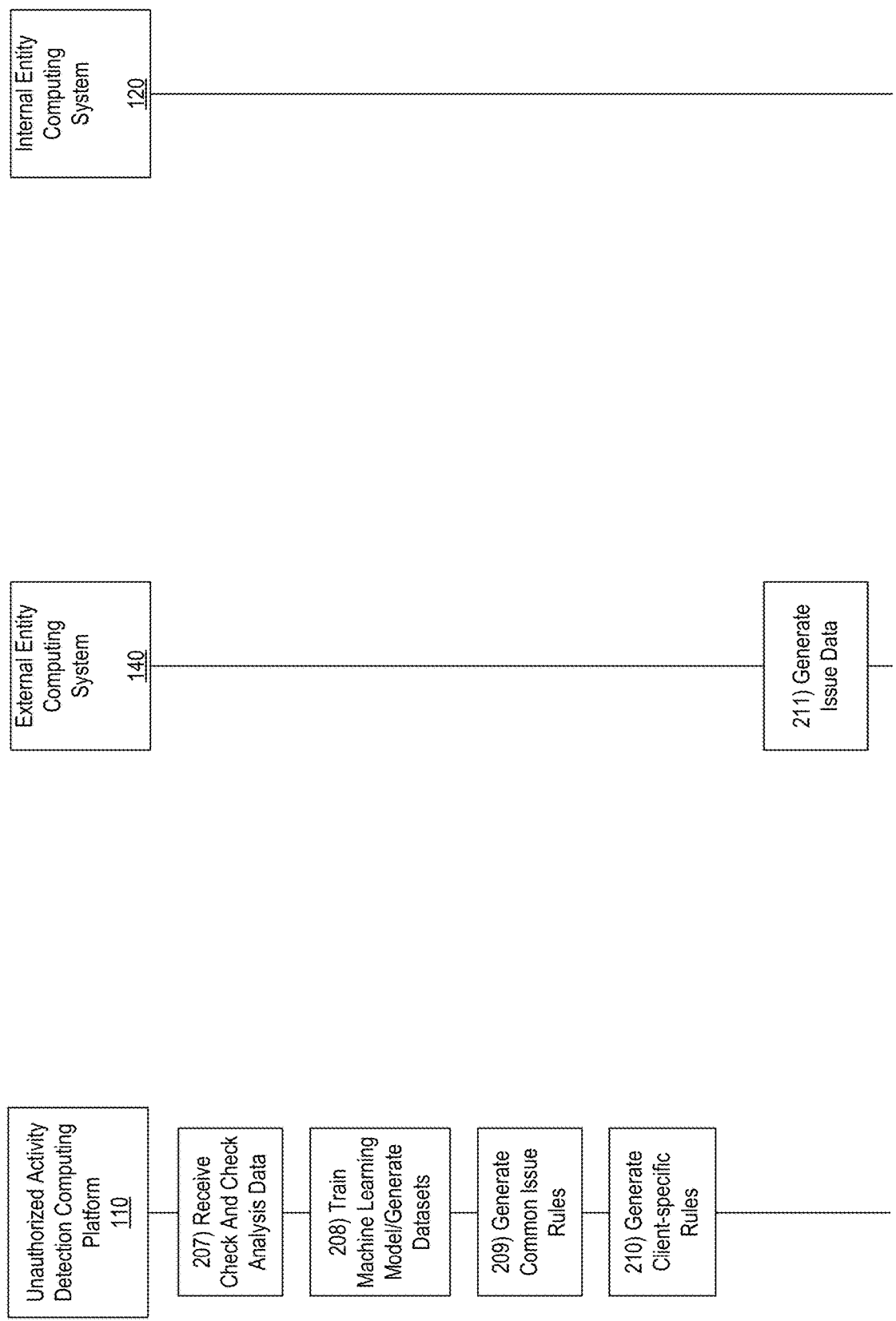

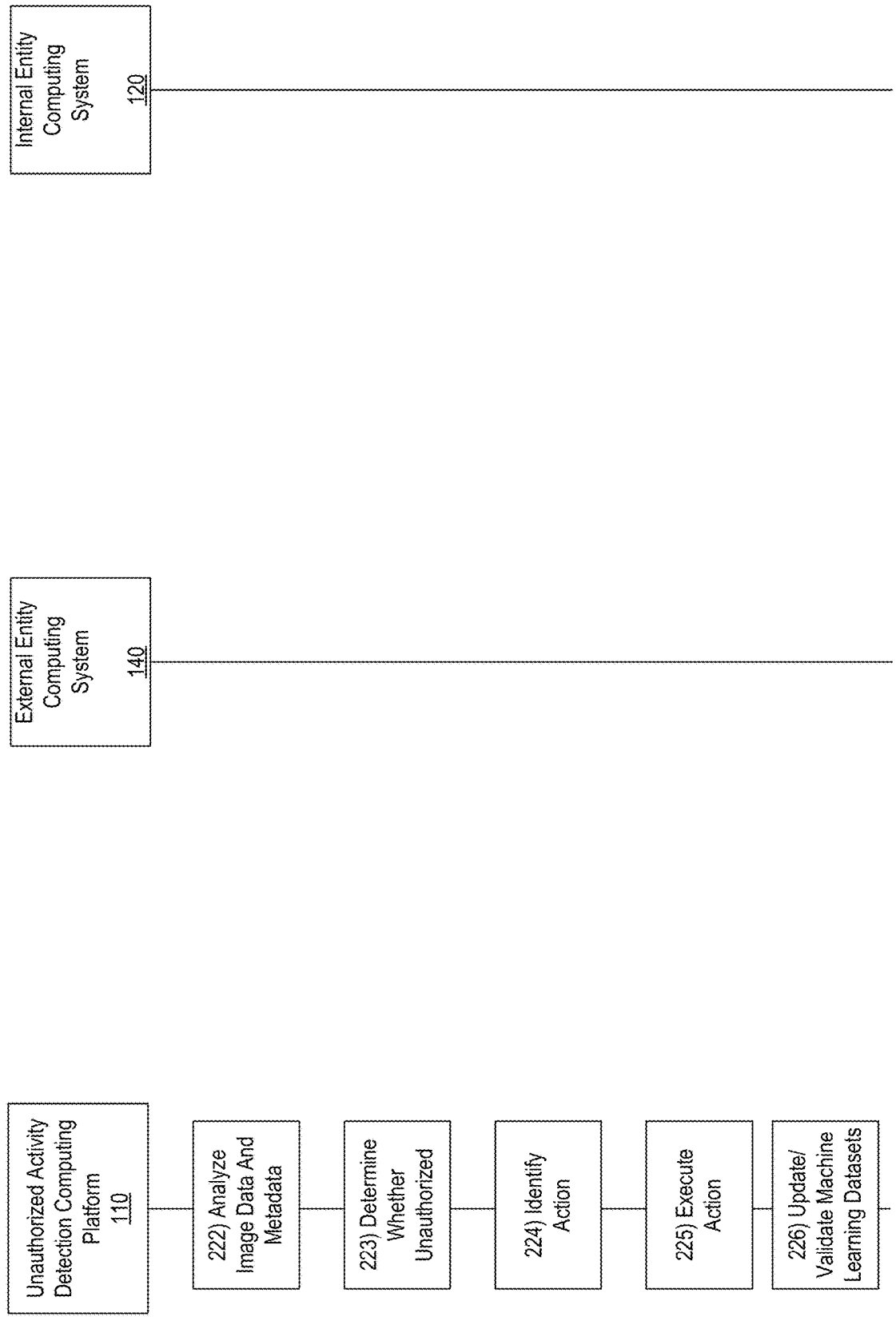

DYNAMIC UNAUTHORIZED ACTIVITY DETECTION

BACKGROUND

Aspects of the disclosure relate to electrical computers, systems, and devices performing unauthorized activity detection.

Detecting unauthorized activity is an important aspect of many business functions. For instance, quickly and efficiently identifying potential unauthorized activity may enable an enterprise organization to mitigate am impact of the unauthorized activity. However, many conventional systems for detecting unauthorized activity are static and rely on conventional data comparisons to detect unauthorized activity. For instance, in reconciling checks, conventional systems may compare payee name to payee name, amount to amount, and the like, and may identify potential unauthorized activity based on that comparison. However, this is inefficient and does not account for particular data characteristics or document attributes used by different customers. Accordingly, a dynamic system for evaluating documents using machine learning to detect unauthorized activity would be advantageous.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with detecting potential unauthorized activity, particular in dealing with check cashing or check reconciliation.

In some aspects, one or more machine learning datasets may be generated based on historical check data (e.g., approve or reject decisions, items sent for further review, or the like). In some arrangements, one or more client or customer-specific rules may be generated that identify and store particular data characteristics or aspects associated with checks of a particular customer. Further, one or more common issue rules may be generated. For instance, as issues arise repeatedly (e.g., more than a threshold number of times) a rule may be generated indicating that this is an expected or common issue and streamlining the evaluation process.

In some arrangements, issue data may be received from, for instance, a customer of an enterprise organization. The issue data may include a data file containing metadata associated with a plurality of checks written or issued by the customer (e.g., from an account held by the enterprise organization). As those checks are cashed, the checks may be reconciled unless unauthorized activity is detected. Accordingly, each check may be evaluated for potential unauthorized activity.

Check data and/or check image data may be received by the enterprise organization. The checks may be cashed at a location of the enterprise organization or at another institution and data may be transmitted from that institution to the enterprise organization. The generated machine learning datasets, client-specific rules, common issue rules, and the like, may be used to analyze the check and/or check image data, as well as the issue data, to determine whether unauthorized or potential unauthorized activity has occurred (e.g., generate an accept or reject decision). Based on the decision, one or more actions may be identified and executed.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2E depict an illustrative event sequence for implementing unauthorized activity detection functions in accordance with one or more aspects described herein;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, early and accurate detection of unauthorized activity is important in mitigating impact of any unauthorized activity. However, evaluating each check cashed can be time consuming and inefficient. Accordingly, aspects described herein rely on machine learning to dynamically evaluate checks to identify unauthorized activity.

As discussed herein, a machine learning model may be trained on historical check data, as well as updated and/or validated based on incoming check data. The machine learning model may identify patterns or sequences in data that may quickly and accurately identify potential unauthorized activity. In some examples, client-specific rules and/or common issue rules may be generated and used in analyzing check data.

As checks are written by a customer of an enterprise organization, issue data may be transmitted from the customer to the enterprise organization. The issue data may include metadata associated with each check written, such as payee name, amount, check number, routing number, account number, and the like.

As checks are cashed, the checks may be imaged or scanned and optical character recognition may be used to capture check data, such as payee name, amount, check number, magnetic ink character recognition (MICR) line data, and the like. This data may be analyzed, with the issue data, using machine learning to accurately identify potential unauthorized activity. For instance, any discrepancies between the issue data and check data may be potential unauthorized activity but, by using machine learning, may be more thoroughly analyzed to determine whether the discrepancy is a common issue (e.g., known and therefore acceptable), is an issue specific to a customer (e.g., expected from that customer), or the like, and therefore, is not actual unauthorized activity.

Based on the analysis, a decision to accept or reject the check may be generated. Based on the decision, one or more actions may be identified and executed.

These and various other arrangements will be discussed more fully below.

Figure 1A:
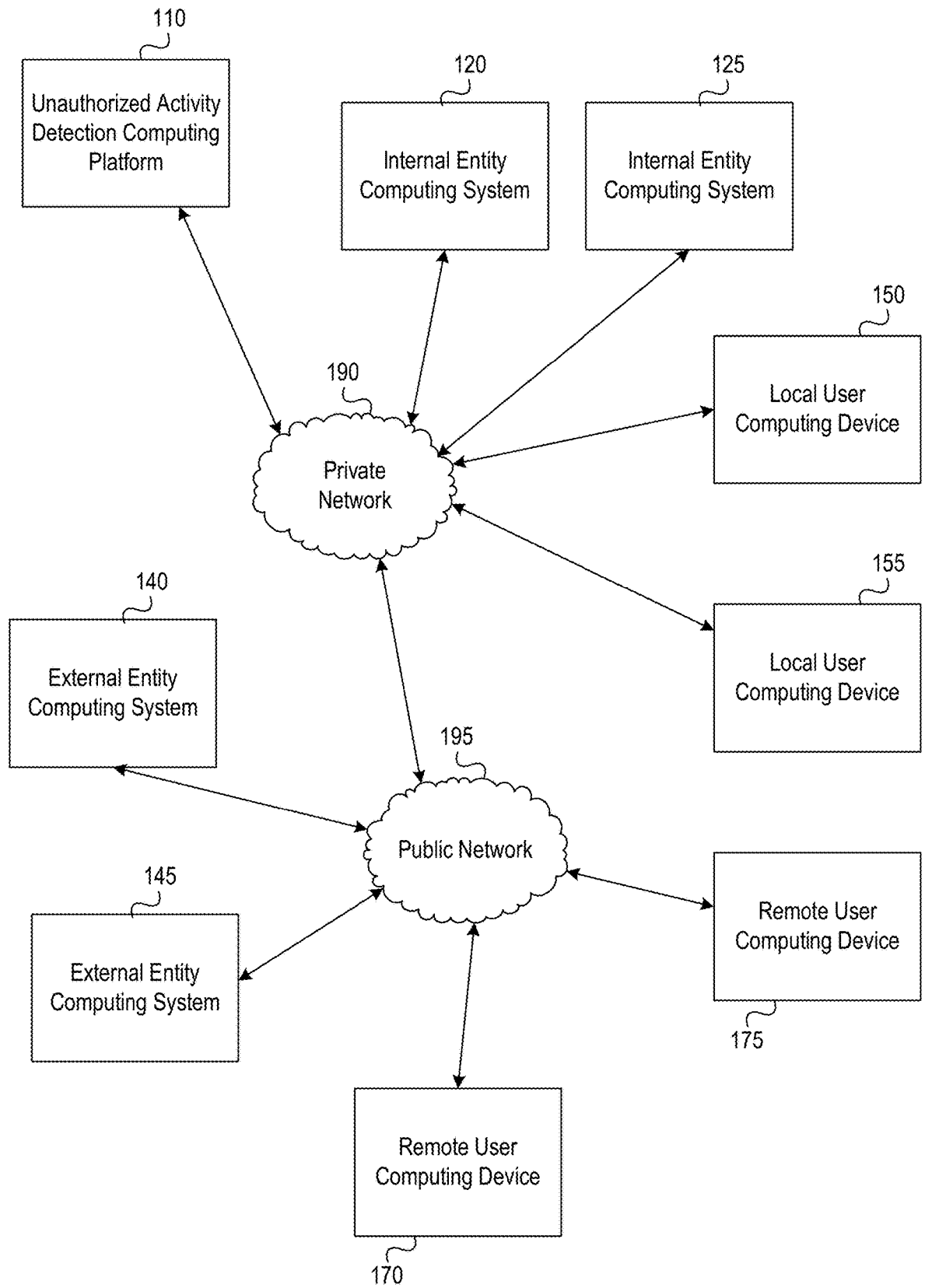
FIGS. 1A and 1B depict an illustrative computing environment for implementing unauthorized activity detection functions in accordance with one or more aspects described herein.
Figure 1B:
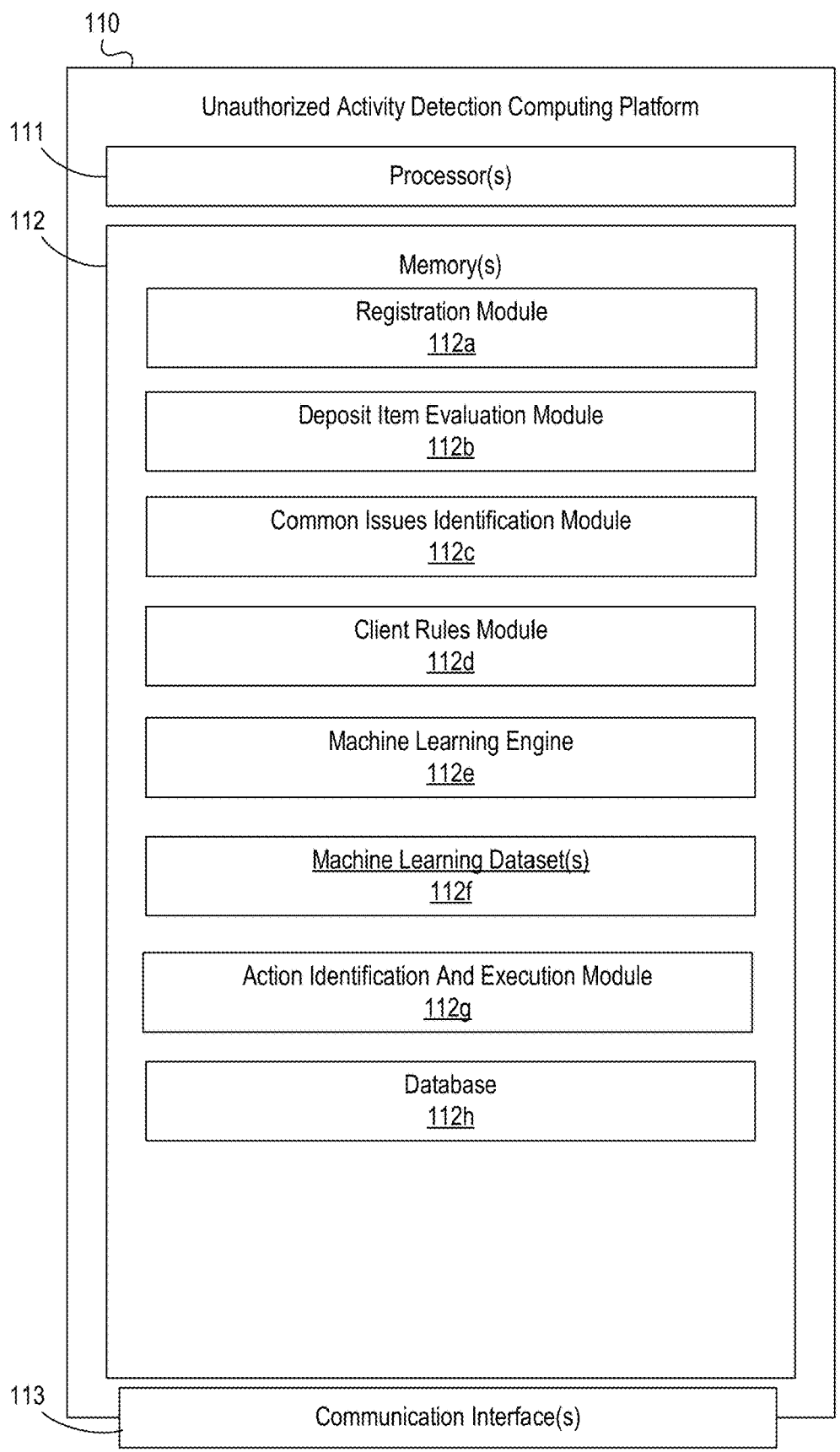

FIGS. 1A-1B depict an illustrative computing environment for implementing and using an unauthorized activity detection system in accordance with one or more aspects described herein. Referring to FIG. 1A, computing environment 100 may include one or more computing devices and/or other computing systems. For example, computing environment 100 may include unauthorized activity detection computing platform 110, internal entity computing system 120, internal entity computing system 125, a first local user computing device 150, a second local user computing device 155, a first remote user computing device 170, a second remote user computing device 175, a first external entity computing system 140 and a second external entity computing system 145. Although two internal entity computing systems 120, 125, two local user computing devices 150, 155, two remote user computing device 170, 175 and two external entity computing systems are shown, more or fewer devices or systems may be used without departing from the invention.

Unauthorized activity detection computing platform 110 may be configured to provide intelligent, dynamic, unauthorized activity detection and control functions. For instance, unauthorized activity detection computing platform may receive issue data from a client or customer. In some examples, issue data may include checks or other items that were written by the customer or client. In some arrangements, the issue data may be analyzed to extract metadata from the issue data. In some examples, the metadata may include data from various known fields on, for example, a check. For instance, metadata associated with data in fields for payee name, check number, routing number, account number, payment amount, date, and the like, may be extracted from the issue data.

In some examples, one or more checks may be received by the enterprise organization. For instance, one or more checks may be deposited or cashed via the enterprise organization or other financial institution. Upon receipt of the check (or request for deposit, or the like), image data of the check may be captured or stored. The image data may then be analyzed (e.g., using optical character recognition) to identify data within the standard fields of the check (e.g., payee name, amount, account number, check number, and the like). This data may be compared to the metadata extracted from the issue data to identify any discrepancies, exceptions (e.g., an amount over a predefined limit, a date more than a threshold number of days old, or the like).

Upon detecting a discrepancy, machine learning may be used to evaluate the discrepancy to determine whether it is an indication of unauthorized activity or is an expected discrepancy. For instance, one or more machine learning datasets may be used to identify one or more patterns or sequences of data that indicate whether the activity is unauthorized or is an expected discrepancy. For instance, client specific rules, expected discrepancy rules, and the like, may be established and machine learning datasets implementing those rules may be generated. The data may then be evaluated to determine (e.g., without manual review) whether the detected activity is unauthorized or expected.

In some examples, data may be continuously received and analyzed and the data may be used to update and/or validate one or more machine learning datasets. In some arrangements, check data may be analyzed in real-time or near real-time in order to execute any mitigating actions.

Internal entity computing system 120 and internal entity computing system 125 may be computing devices associated with the entity or enterprise organization implementing the unauthorized activity detection computing platform 110. In some examples, internal entity computing system 120 and/or internal entity computing system 125 may include systems or devices associated with various systems, applications, or the like within or hosted by the enterprise organization and may include or store account information, customer information, and the like. In some examples, internal entity computing system 120 and/or internal entity computing system 125 may include self-service kiosks, such as an automated teller machine (ATM), automated teller assistant (ATA) and the like. Accordingly, internal entity computing system 120 and/or internal entity computing system 125 may receive checks or other items for deposit, capture images of the checks for deposit, transmit image data, or the like. In some arrangements, internal entity computing system 120 and/or internal entity computing system 125 may receive check and/or check image data from a second, different entity at which the check was cashed in order to reconcile the check.

External entity computing system 140, external entity computing system 145, and the like may be computing systems or devices associated with an entity external to the enterprise organization. For instance, external entity computing system 140 and/or external entity computing system 145 may be associated with an entity different from the enterprise organization implementing the unauthorized activity detection computing platform 110 and may, in some examples, be associated with customers of the enterprise organization. In some arrangements, issue data associated with the checks written by the customer and being processed by the enterprise organization may be transmitted from external entity computing system 140 and/or external entity computing system 145 to the unauthorized activity detection computing platform 110.

Local user computing device 150, local user computing device 155, and the like, may be computing devices associated with or used by one or more employees of the enterprise organization to perform various job functions. The computing devices 150, 155 may include various types of user computing devices and may display one or more user interfaces associated with a website, evaluation potential occurrences of unauthorized activity, generate customer or client-specific rules, expected or common issue rules, and the like.

The remote user computing device 170 and remote user computing device 175 may be used to communicate with, for example, one or more systems, computing platforms, devices, or the like. In some examples, remote user computing device 170 and/or remote user computing device 175 may be devices associated with a user but not owned by the enterprise organization. In some examples, users may access one or more systems of the enterprise organization (e.g., internal computing system 120, 125) via remote user computing device 170 or remote user computing device 175.

Computing environment 100 also may include one or more computing platforms. For example, and as noted above, computing environment 100 may include unauthorized activity detection computing platform 110. As illustrated in greater detail below, unauthorized activity detection computing platform 110 may include one or more computing devices configured to perform one or more of the functions described herein. For example, unauthorized activity detection computing platform 110 may include one or more computers (e.g., laptop computers, desktop computers, servers, server blades, or the like).

As mentioned above, computing environment 100 also may include one or more networks, which may interconnect one or more of unauthorized activity detection computing platform 110, internal entity computing system 120, internal entity computing system 125, external entity computing system 140, external entity computing system 145, local user computing device 150, local user computing device 155, remote user computing device 170, and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, unauthorized activity detection computing platform 110, internal entity computing system 120, internal entity computing system 125, local user computing device 150, and local user computing device 155, may be associated with an enterprise organization (e.g., a financial institution), and private network 190 may be associated with and/or operated by the organization, and may include one or more networks (e.g., LANs, WANs, virtual private networks (VPNs), or the like) that interconnect unauthorized activity detection computing platform 110, internal entity computing system 1 120, internal entity computing system 2 125, local user computing device 150, local user computing device 155, and one or more other computing devices and/or computer systems that are used by, operated by, and/or otherwise associated with the organization. Public network 195 may connect private network 190 and/or one or more computing devices connected thereto (e.g., unauthorized activity detection computing platform 110, internal entity computing system 1 120, internal entity computing system 2 125, local user computing device 150, local user computing device 155) with one or more networks and/or computing devices that are not associated with the organization. For example, external entity computing system 140, external entity computing system 145, remote user computing device 170, remote user computing device 175, might not be associated with an organization that operates private network 190 (e.g., because external entity computing system 140, external entity computing system 145, remote user computing device 170, remote user computing device 175, may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the Internet) that connect external entity computing system 140, external entity computing system 145, remote user computing device 170, remote user computing device 175, to private network 190 and/or one or more computing devices connected thereto (e.g., unauthorized activity detection computing platform 110, internal entity computing system 120, internal entity computing system 125, local user computing device 150, local user computing device 155).

Referring to FIG. 1B, unauthorized activity detection computing platform 110 may include one or more processors 111, memory 112, and communication interface 113. A data bus may interconnect processor(s) 111, memory 112, and communication interface 113. Communication interface 113 may be a network interface configured to support communication between unauthorized activity detection computing platform 110 and one or more networks (e.g., private network 190, public network 195, or the like). Memory 112 may include one or more program modules having instructions that when executed by processor(s) 111 cause unauthorized activity detection computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of unauthorized activity detection computing platform 110 and/or by different computing devices that may form and/or otherwise make up unauthorized activity detection computing platform 110.

For example, memory 112 may have, store and/or include a registration module 112a. Registration module 112a may store instructions and/or data that may cause or enable the unauthorized activity detection computing platform 110 to receive data related to one or more customers (e.g., customers of the enterprise organization implementing the unauthorized activity detection computing platform 110). For instance, customers having accounts at a financial institution may write or issue checks from an account held by the financial institution. These customers may register with the system. Registration information may include name or other identifier of the customer, account information and/or authorization to access or retrieve account information, particular rules or aspects associated with the customer, and the like. In some examples, registration information may be received from a customer computing system (such as external entity computing system 140, 145) and/or may be retrieved from internal systems, such as internal entity computing system 120, 125.

Unauthorized activity detection computing platform 110 may further have, store and/or include deposit item evaluation module 112b. Deposit item evaluation module 112b may store instructions and/or data that may cause or enable the unauthorized activity detection computing platform 110 to receive issue data from a customer (e.g., from external entity computing system 140, 145), receive image data associated with a check or other deposit item, and analyze the received data. In some examples, deposit item evaluation module 112*b* may extract metadata from received issue data and compare the metadata to, for instance, image data captured from the check or deposit item. In some examples, deposit item evaluation module 112*b* may apply one or more rules (e.g., client specific rules, common issues rules, or the like) to the analysis in order to accurately detect potential unauthorized activity.

Unauthorized activity detection computing platform 110 may further have, store and/or include common issues identification module 112*c*. Common issues identification module 112*c* may store instructions and/or data that may cause or enable the unauthorized activity detection computing platform 110 to receive input identifying one or more common issues and/or automatically identify one or more common issues associated with one or more checks or other deposit items. For instance, a particular customer may include additional information on a check (e.g., a lock box number, a symbol, and/or other unexpected data). This may be identified as a "common issue" and, as such, may override any indication that this is a potentially unauthorized deposit. Common issues may be identified via user input (e.g., by an employee of the enterprise organization identifying the issue and transmitting the identified issue from, for instance, local user computing device 150 to the unauthorized activity detection computing platform 110) and/or by analysis of historical data in combination with machine learning, as will be discussed more fully herein.

In some examples, common issues rules may be dynamically generated as incoming check data is evaluated. For instance, if a same issue is identified at least a threshold number of times and evaluation indicates that this is not unauthorized activity, a common issue rule may automatically be generated. For instance, in continuing the example above, the additional data provided on a check may be detected and further evaluated. If it is detected and evaluated and a determination is made that the additional data is not an indication of unauthorized activity at least a threshold number of times (e.g., 5 times, 100 times, 250 times, or the like), a common issue rule may be generated that may acknowledge that particular issue as not unauthorized activity, thereby reducing resources associated with evaluating future checks having the same additional data, type of data, or the like. Various other examples may be used without departing from the invention.

Unauthorized activity detection computing platform 110 may further have, store and/or include client rules module 112*d*. Client rules module 112*d* may store instructions and/or data that may cause or enable the unauthorized activity detection computing platform 110 to receive input identifying one or more customer-specific rules to apply in analyzing checks or deposit items for potential unauthorized activity. In some examples, the customer-specific rules may be provided via user input from an employee of the enterprise organization (e.g., from local user computing device 150). Additionally or alternatively, the customer-specific rules may be generated based on historical data analysis and/or machine learning, as will be discussed more fully herein.

As discussed herein, machine learning may be used to identify occurrences of unauthorized activity, identify expected anomalies that would, in conventional systems may identified as unauthorized activity but, applying the arrangements described herein would be recognized as not unauthorized, generate customer-specific rules, generated common issues rules, and the like. Accordingly, unauthorized activity detection computing platform 110 may further have, store and/or include a machine learning engine 112*e* and machine learning datasets 112*f*. Machine learning engine 112*e* and machine learning datasets 112*f* may store instructions and/or data that may cause or enable unauthorized activity detection computing platform 110 to analyze checks or other deposit items for potential unauthorized activity and apply generated rules to improve accuracy of the evaluation. For instance, machine learning datasets 112*f* may be generated by analyzing historical datasets over time. Accordingly, a machine learning model may be trained based on historical data in which items were identified as potentially unauthorized, further evaluated, and feedback from the further evaluation was provided to identify whether the item was or was not unauthorized. This training data may be used to generated one or more machine learning datasets linking particular characteristics of a check or deposit item to a determination of whether the check or deposit item is unauthorized activity.

Machine learning datasets 112*f* may be generated based on analyzed data (e.g., data from previously received data, and the like), raw data, and/or received from one or more outside sources.

The machine learning engine 112*e* may receive issue data (e.g., data from a customer issuing a check), rules data, image data, optical character recognition data, and the like, and, using one or more machine learning algorithms, may generate one or more machine learning datasets 112*f*. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention. In some examples, the machine learning engine 112*e* may analyze data to identify patterns of activity, sequences of activity, and the like, to generate one or more machine learning datasets 112*f*.

In some examples, the machine learning datasets 112*f* may include machine learning data linking, for example, particular characteristics or details of a check to an outcome of unauthorized or authorized. As additional data is received, the one or more machine learning datasets 112*f* may be updated and/or validated.

Unauthorized activity detection computing platform 110 action identification and execution module 112*g*. Action identification and execution module 112*g* may store instructions and/or data that may cause or enable the unauthorized activity detection computing platform 110 to evaluate a check or deposit item to determine whether it is unauthorized activity or not unauthorized and identify and execute one or more actions based on the outcome. For instance, if a check is determined to be unauthorized activity (or potential unauthorized activity), for instance, based on machine learning analysis, the check may be forwarded to a system or device for further processing. For instance, the check and/or check data may be forwarded to, for example, local user computing device 150, for further evaluation. Alternatively, if the check is evaluated and determined to not be unauthorized activity, the check may be automatically reconciled and funds transferred to and/or from appropriate accounts.

Unauthorized activity detection computing platform 110 may further have, store and/or include one or more databases 112*h*. Database 112*h* may store data including issue data received from one or more customers, account data, rules data, and the like.

FIGS. 2A-2E depict one example illustrative event sequence for implementing and using unauthorized activity detection functions in accordance with one or more aspects described herein. The events shown in the illustrative event sequence are merely one example sequence and additional events may be added, or events may be omitted, without departing from the invention.

At step 201, registration data may be received. For instance, registration data from one or more customers of the enterprise organization may be received. The registration data may include customer name or other identifier, account information or approval to access or retrieve account information (e.g., from one or more enterprise organization systems or devices), and the like. In some examples, registration data may include customer specific data that may be used to generate one or more client-specific rules and/or common issue rules.

At step 202, a registration entry may be generated. For instance, a database may be modified to include an entry associated with the registration data for the user. The entry may include a plurality of data elements associated with the customer, customer accounts, and the like.

At step 203, check data may be received by one or more enterprise organization computing devices or systems, such as internal entity computing system 120. The check data may include a plurality of checks being cashed and may include image data associated with the checks. In some examples, the check data may be received over a period of time (e.g., one month, one year, three years, or the like).

At step 204, check analysis data may be captured. In some examples, check analysis data may include an output from an evaluation of whether each check was associated with unauthorized activity or authorized activity. This data may be captured for each check received in the check data and may, in some examples, include a manual review of a particular check or image data associated with a check to determine whether it is unauthorized.

At step 205, a connection may be established between the internal entity computing system 120 and the unauthorized activity detection computing platform 110. For instance, a first wireless connection may be established between the internal entity computing system 120 and the unauthorized activity detection computing platform 110. Upon establishing the first wireless connection, a communication session may be initiated between unauthorized activity detection computing platform 110 and internal entity computing system 120.

At step 206, the check data and check analysis data may be transmitted from the internal entity computing system 120 to the unauthorized activity detection computing platform 110. In some examples, the check data and check analysis data may be transmitted during the communication session initiated upon establishing the first wireless connection.

With reference to FIG. 2B, at step 207, the check and check analysis data may be received by the unauthorized activity detection computing platform 110 and stored.

At step 208, a machine learning model may be trained with the check and check analysis data. For instance, one or more machine learning datasets may be generated based on the received check and check analysis data. In some examples, the check and check analysis data may be received in, for instance, a batch transfer of historical data. Additionally or alternatively, the check and check analysis data may be received over time and used as machine learning training data over a period of time.

At step 209, one or more common issue rules may be generated. For instance, one or more common or often-occurring issues may be identified (e.g., from the check and check analysis data, from user input, using machine learning, or the like). For instance, a particular scanning or image capture device may cause a stray mark to appear in check image data. Accordingly, in conventional systems, the stray mark may cause a check scanned or imaged using that device to be flagged as unauthorized activity or potential unauthorized activity which may then require a manual review. This may be inefficient and inaccurate. Accordingly, arrangements described herein may identify this scanning or image capture device as causing the stray mark and may generate a rule indicating that the stray mark is an expected or common issue associated with checks scanned or imaged with that device. Accordingly, during the check analysis, the rule may be applied and a more accurate output of unauthorized or authorized may be generated. Various other common issues may be identified and associated rules generated without departing from the invention.

At step 210, one or more client or customer-specific rules may be generated. For instance, one or more rules specific to unique aspects of a customer check or check processing aspect may be generated. For example, a customer may put additional information on a check (e.g., information other than data provided in an expected field). In some examples, a customer may include, for instance, a symbol, internal reference number, or the like, on the check. While a conventional system may identify this additional data as unauthorized activity or potential unauthorized activity, arrangements described herein may generate a rule recognizing the additional data, the particular customer associated with the additional data, and the like. The rule may then be applied when analyzing checks to improve accuracy in identifying potential unauthorized activity.

At step 211, issue data may be generated by, for instance, external entity computing system 140. In some examples, issue data may include data associated with checks issued by the external entity (e.g., customer of the enterprise organization). In some examples, checks that are routinely written by the entity, such as payroll checks, may be included in the issue data. Additionally or alternatively, issue data may include data associated with all checks issued or written by the external entity (e.g., customer) in a predetermined time period (e.g., one day, one month, or the like). The issue data may include a data file including metadata associated with each check written. The metadata may include information such as check number, payee name, amount, and the like. This data may be used by the enterprise organization to reconcile checks written by the customer after they have been cashed. Further, this data may be used to detect unauthorized activity or potential unauthorized activity.

Figure 2A:
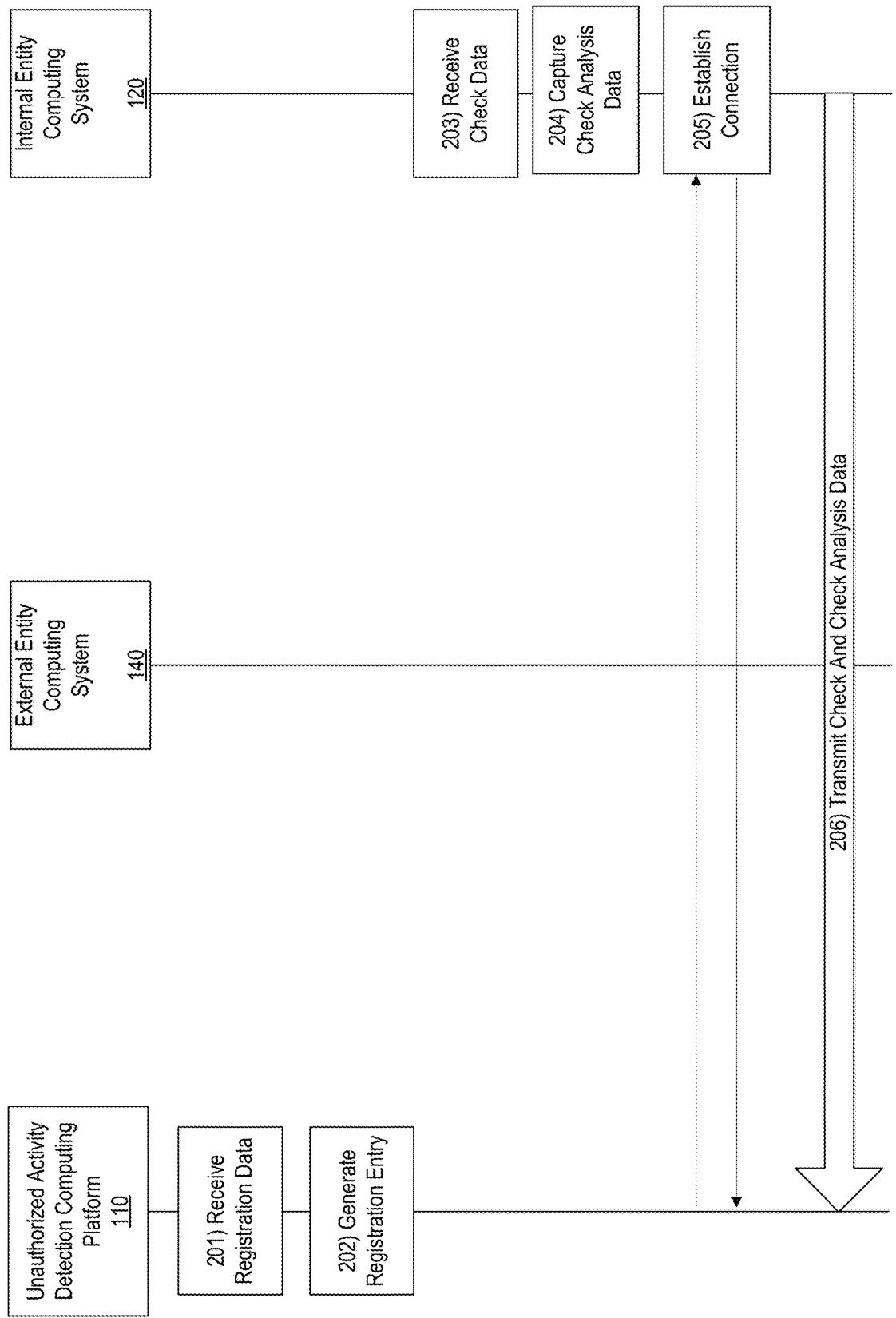
Figure 2C:
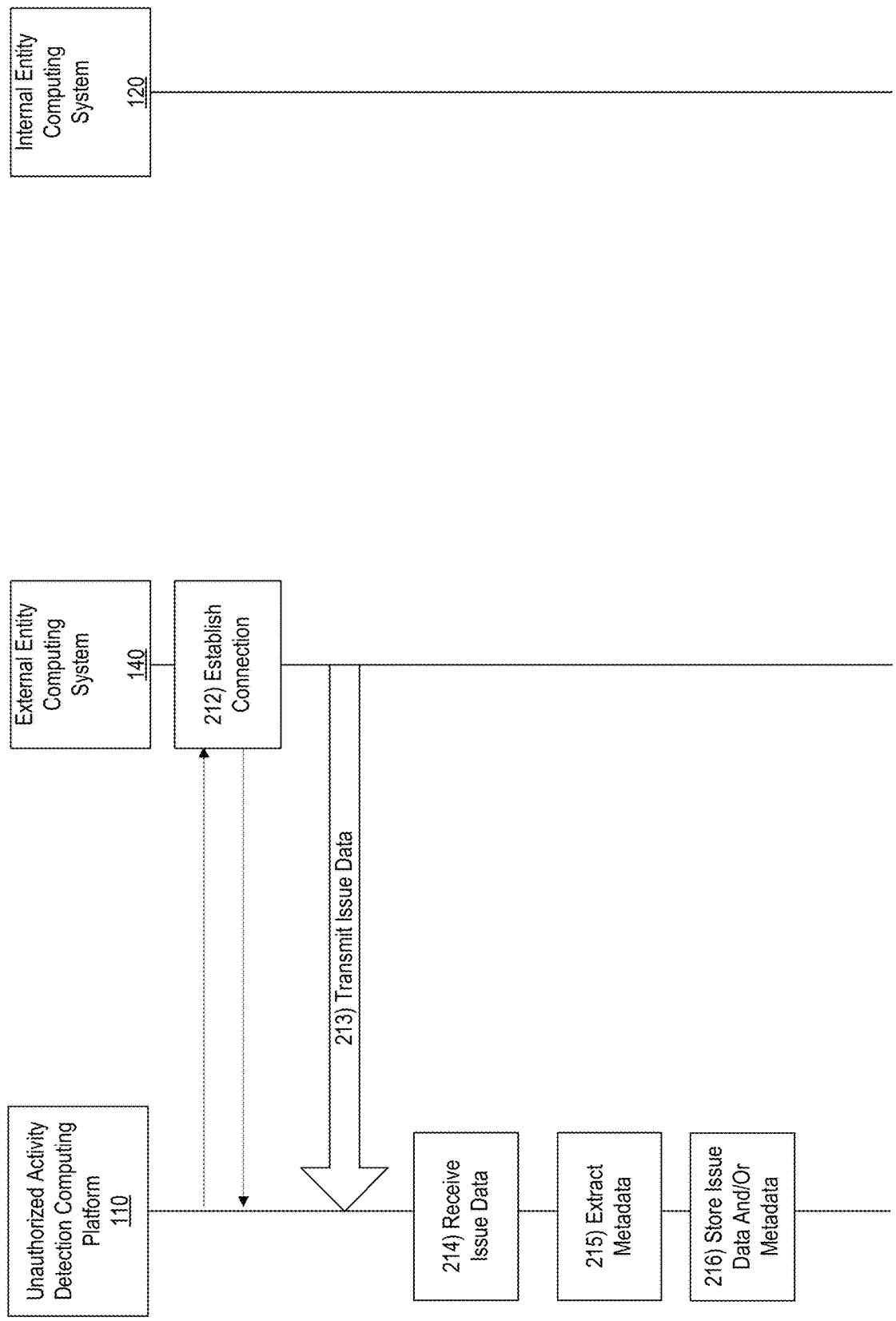

With reference to FIG. 2C, at step 212, a connection may be established between the external entity computing system 140 and the unauthorized activity detection computing platform 110. For instance, a second wireless connection may be established between the external entity computing system 140 and the unauthorized activity detection computing platform 110. Upon establishing the second wireless connection, a communication session may be initiated between unauthorized activity detection computing platform 110 and external entity computing system 140.

At step 213, the generated issue data may be transmitted from the external entity computing system 140 to the unauthorized activity detection computing platform 110. For instance, the issue data may be transmitted during the communication session initiated upon establishing the second wireless connection.

At step 214, the issue data may be received by the unauthorized activity detection computing platform 110.

At step 215, metadata may be extracted from the received issue data. For instance, metadata in the data file associated with the issue data and providing data associated with checks written or issued by the customer may be extracted.

At step 216, the issue data and/or extracted metadata may be stored by the unauthorized activity detection computing platform 110.

Figure 2D:
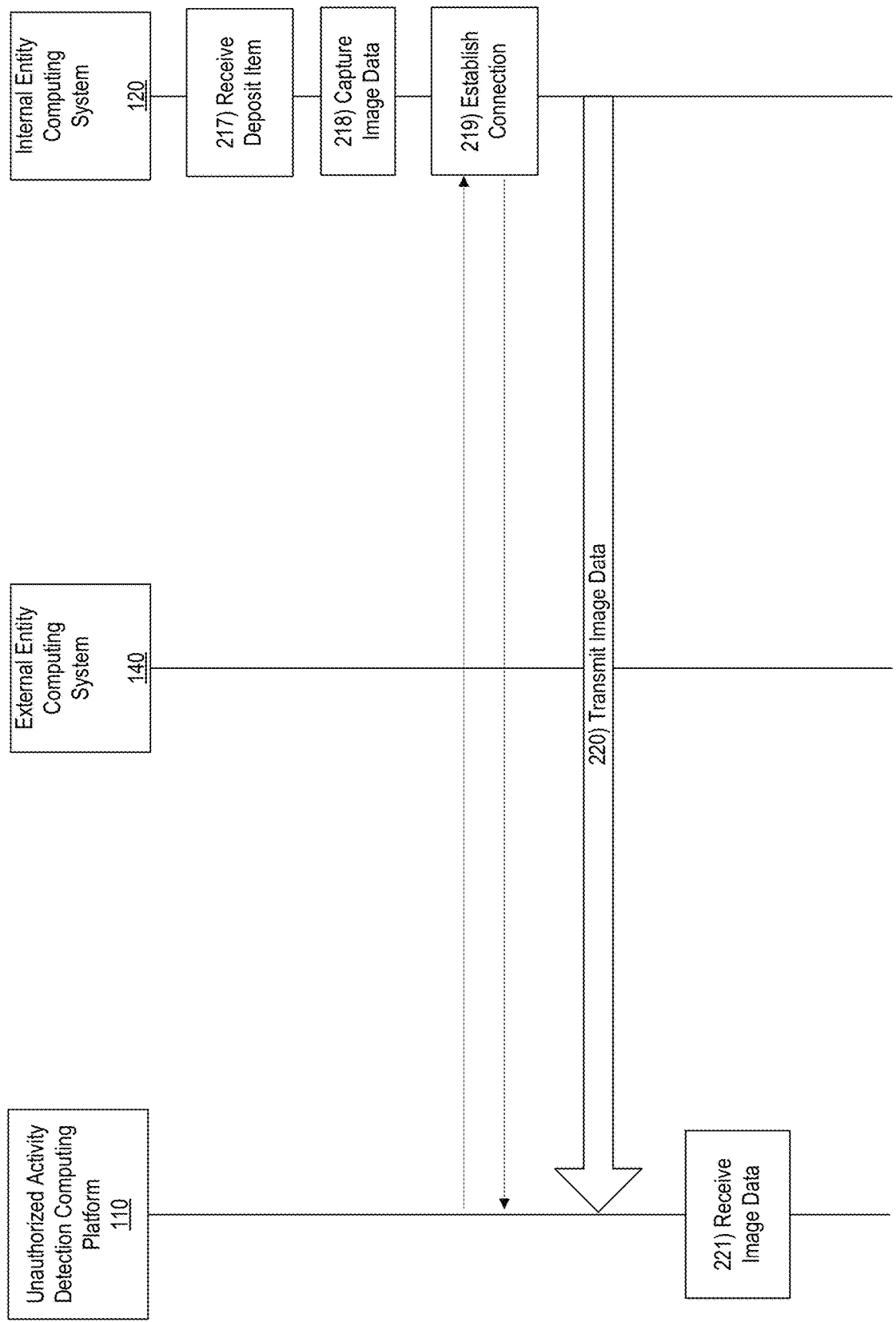

With reference to FIG. 2D, at step 217, a deposit item may be received by, for instance, internal entity computing system 120. For instance, a check (e.g., written by the customer from whom issue data was received) may be received by an internal entity computing system 120, such as an ATM, banking associated computing device, or the like.

At step 218, image data of the received check may be captured. For instance, the check may be scanned (e.g., by a scanning device associated with the banking associate computing device, by an image capture device associated with the ATM, or the like) and image data may be generated. In some examples, the image data may include an image of a front of the check as well as a back of the check. In some examples, capturing image data may include performing optical character recognition or other image analysis techniques to capture data from the image.

In some examples, steps 217 and 218 may be omitted and check image data may be received from, for example, a computing system of another enterprise organization, such as another financial institution different from the financial institution implementing the unauthorized activity detection computing platform 110.

At step 219, a connection may be established between the internal entity computing system 120 and the unauthorized activity detection computing platform 110. For instance, a third wireless connection (e.g., subsequent to the first wireless connection) may be established between the internal entity computing system 120 and the unauthorized activity detection computing platform 110. Upon establishing the third wireless connection, a communication session may be initiated between unauthorized activity detection computing platform 110 and internal entity computing system 120. Alternatively, the first wireless connection may be maintained.

At step 220, the image data may be transmitted from the internal entity computing system 120 to the unauthorized activity detection computing platform 110. For instance, the image data may be transmitted during the communication session initiated upon establishing the third wireless connection (or first wireless connection if maintained).

At step 221, the image data may be received by the unauthorized activity detection computing platform 110.

With reference to FIG. 2E, at step 222, the image data and the metadata from the issue data may be analyzed using, for example, machine learning. For instance, machine learning may be used to analyze the image data, including any data captured via optical character recognition, and the metadata received from the customer to determine whether unauthorized activity or potential unauthorized activity is detected. In some examples, analyzing the image data and metadata may include applying or executing one or more common issue rules, client-specific rules, and the like. In some arrangements, a client or customer may be identified from the issue data and the machine learning engine may identify client-specific rules to apply based on the identified customer or client.

At step 223, a decision or output of whether each check is unauthorized activity or not unauthorized activity (e.g., an accept or reject decision) may be generated. For instance, based on the machine learning analysis, a decision of unauthorized or not unauthorized may be generated.

At step 224, one or more actions for execution may be generated. For instance, if a decision is output that a check is unauthorized activity, an action including forwarding the check and/or check data, issue data associated with that check, and the like, to a computing device (such as local user computing device 150) or user may be identified. Alternatively, if a decision is output that a check is not unauthorized activity, an action including automatically reconciling the check may be identified (e.g., a balance associated with the account from which the check was written may be modified).

At step 225, the one or more identified actions may be executed. For instance, data maybe transmitted to another computing device for further analysis, a check may be automatically reconciled, or the like.

At step 226, one or more machine learning datasets may be updated and/or validated based on the decisioning performed on the checks received. For instance, machine learning datasets may be updated and/or validated (e.g., further trained) based on the decisioning process for this data. Accordingly, the machine learning datasets are constantly being refined and tuned.

Figure 3:
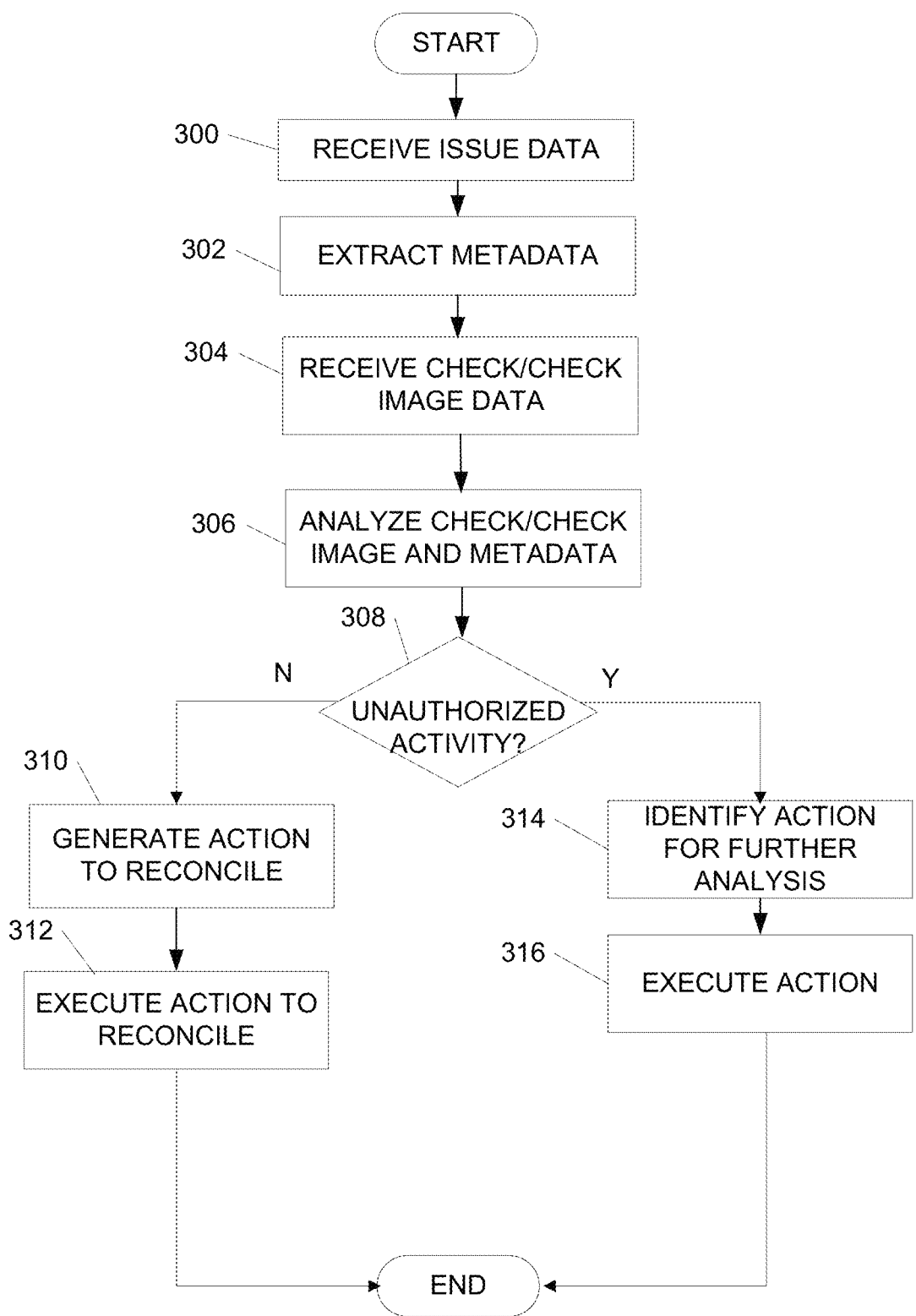
FIG. 3 depicts an illustrative method for implementing and using unauthorized activity detection functions according to one or more aspects described herein.

FIG. 3 is a flow chart illustrating one example method of implementing unauthorized activity detection functions according to one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described.

At step 300, issue data may be received from one or more customers or clients of the enterprise organization. For instance, issue data associated with checks issued or written by or on behalf of the customer or client may be transmitted from a customer device, such as external entity computing system 140, to the unauthorized activity detection computing platform 110. In some examples, the issue data may include a data file containing metadata associated with each issued check (e.g., payee name, check number, amount, and the like).

At step 302, metadata may be extracted from the issue data. For instance, metadata associated with each check issued by the customer or client may be extracted.

At step 304, check and/or check image data may be received. For instance, if a check is presented to be cashed at a location associated with the enterprise organization, the check may be received and scanned or otherwise imaged. In some examples, optical character recognition may be used to capture data from the check or check image. Additionally or alternatively, check data may be received. The check data may include image data, optical character recognition data, and the like. In some examples, check data may be received from, for example, another, different financial institution and transmitted to the enterprise organization in order to reconcile the check.

At step 306, the check/check image data and metadata may be analyzed using machine learning. For instance, machine learning may be used to compare the check and/or check image data (e.g., including optical character recognition data) to the metadata extracted from the issue data to generate an accept or reject decision. For instance, the machine learning analysis may include applying one or more customer-specific or common issue rules, as discussed herein. The analysis may be used to determine whether a check includes unauthorized activity or potential unauthorized activity (e.g., reject decision) or does not include unauthorized activity (e.g., accept decision) and an associated output may be generated.

At step 308, the output of the machine learning analysis may be analyzed to determine whether there is unauthorized activity or potential unauthorized activity (e.g., reject decision). If not, an action to reconcile the check may be identified at step 310 and, at step 312, the action may be executed and the check may be automatically reconciled.

If, at step 308, there is unauthorized activity or potential unauthorized activity, at step 314, one or more actions may be identified to further evaluate the check for unauthorized activity, mitigate impact of the unauthorized activity, and the like. For instance, one or more actions causing the check and/or check data to be transmitted to another computing device for further analysis may be identified.

At step 316, the identified one or more actions may be executed. For instance, the action may be executed and the unauthorized activity detection computing platform 110 may cause the check or check data to be transmitted to another device, may generate a user interface indicating that there may be unauthorized activity and cause the user interface to be transmitted to and displayed on a computing device, and the like.

Figure 4:
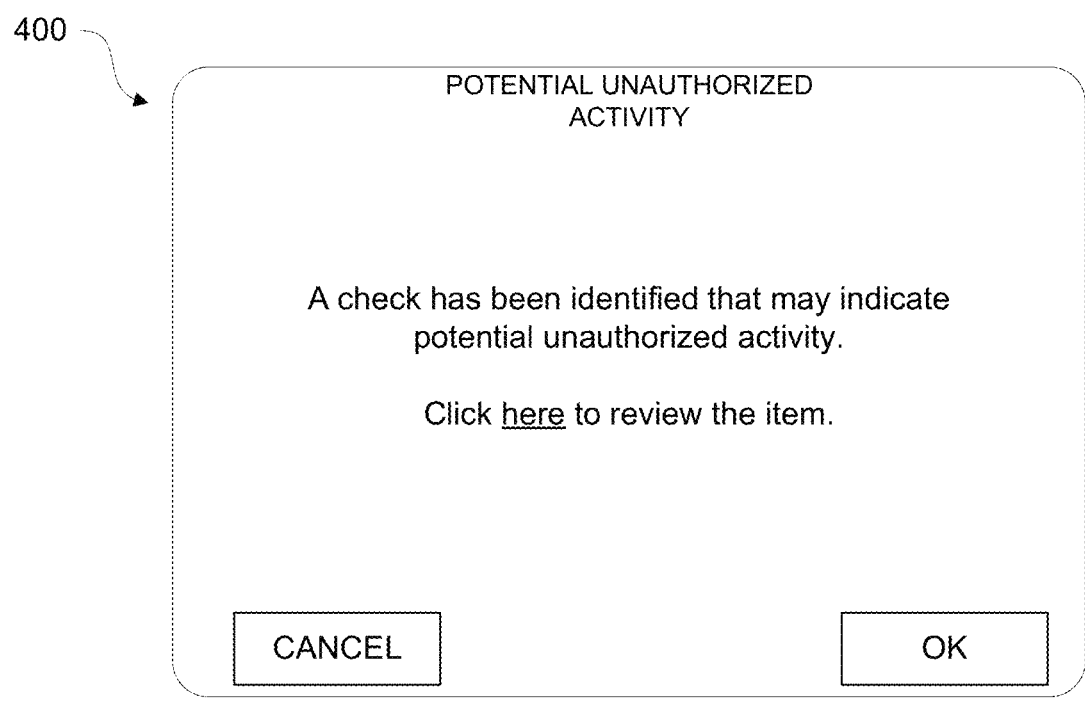
FIG. 4 illustrates one example interactive user interface that may be generated and/or displayed in accordance with one or more aspects described herein.

FIG. 4 illustrates one example user interface that may be generated in accordance with one or more aspects described herein. The user interface 400 may include that an incident of unauthorized activity or potential unauthorized activity has been identified. In some examples, the user interface 400 may include a selectable link that, when selected by a user, may cause display of additional data associated with the incident of unauthorized or potentially unauthorized activity. For instance, selection of the link may cause display of a second user interface including details of the check (e.g., check number, payee name, amount and the like), identification of an issue flagged, and the like.

As discussed herein, arrangements described provide for improved accuracy and efficiency in evaluating checks to determine whether unauthorized activity or other discrepancies have occurred. By using machine learning, the checks may be dynamically evaluated, using constantly improving datasets, to accurately detect and process checks that should be reconciled and those that require additional evaluation due to unauthorized activity. In some examples, an enterprise organization may evaluate thousands or even hundreds of thousands of checks per day. The smart, dynamic arrangements described herein for evaluating checks using machine learning may greatly reduce or eliminate resources allocated to the check review process.

By leveraging historical check processing data to generate machine learning datasets, generate client-specific rules, generate common issue rules, and the like, and by constantly refining those datasets and rules based on newly processed data, the system may dynamically evaluate checks using the most up to date information available to make an accept or reject decision. This constant updating and validating may also enable quick identification of new issues, changes to previous client processes that resulted in a rule and may require a rule modification, or the like. Accordingly, the system may be constantly improving to ensure accuracy of decisions.

Figure 5:
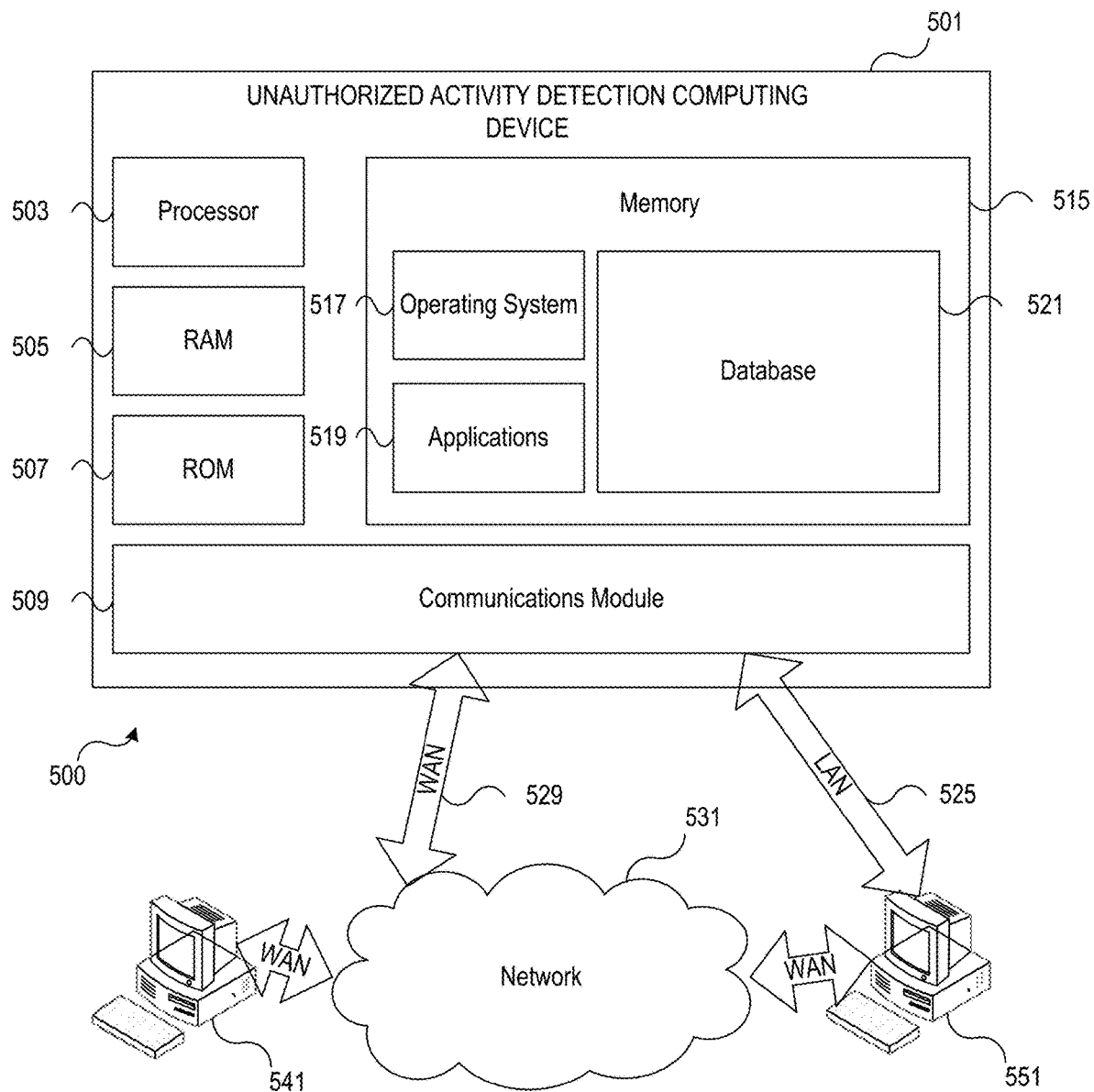
FIG. 5 illustrates one example environment in which various aspects of the disclosure may be implemented in accordance with one or more aspects described herein.

FIG. 5 depicts an illustrative operating environment in which various aspects of the present disclosure may be implemented in accordance with one or more example embodiments. Referring to FIG. 5, computing system environment 500 may be used according to one or more illustrative embodiments. Computing system environment 500 is only one example of a suitable computing environment and is not intended to suggest any limitation as to the scope of use or functionality contained in the disclosure. Computing system environment 500 should not be interpreted as having any dependency or requirement relating to any one or combination of components shown in illustrative computing system environment 500.

Computing system environment 500 may include unauthorized activity detection computing device 501 having processor 503 for controlling overall operation of unauthorized activity detection computing device 501 and its associated components, including Random Access Memory (RAM) 505, Read-Only Memory (ROM) 507, communications module 509, and memory 515. Unauthorized activity detection computing device 501 may include a variety of computer readable media. Computer readable media may be any available media that may be accessed by unauthorized activity detection computing device 501, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by unauthorized activity detection computing device 501.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on unauthorized activity detection computing device 501. Such a processor may execute computer-executable instructions stored on a computer-readable medium.

Software may be stored within memory 515 and/or storage to provide instructions to processor 503 for enabling unauthorized activity detection computing device 501 to perform various functions as discussed herein. For example, memory 515 may store software used by unauthorized activity detection computing device 501, such as operating system 517, application programs 519, and associated database 521. Also, some or all of the computer executable instructions for unauthorized activity detection computing device 501 may be embodied in hardware or firmware. Although not shown, RAM 505 may include one or more applications representing the application data stored in RAM 505 while unauthorized activity detection computing device

501 is on and corresponding software applications (e.g., software tasks) are running on unauthorized activity detection computing device 501.

Communications module 509 may include a microphone, keypad, touch screen, and/or stylus through which a user of unauthorized activity detection computing device 501 may provide input, and may also include one or more of a speaker for providing audio output and a video display device for providing textual, audiovisual and/or graphical output. Computing system environment 500 may also include optical scanners (not shown).

Unauthorized activity detection computing device 501 may operate in a networked environment supporting connections to one or more remote computing devices, such as computing devices 541 and 551. Computing devices 541 and 551 may be personal computing devices or servers that include any or all of the elements described above relative to unauthorized activity detection computing device 501.

The network connections depicted in FIG. 5 may include Local Area Network (LAN) 525 and Wide Area Network (WAN) 529, as well as other networks. When used in a LAN networking environment, unauthorized activity detection computing device 501 may be connected to LAN 525 through a network interface or adapter in communications module 509. When used in a WAN networking environment, unauthorized activity detection computing device 501 may include a modem in communications module 509 or other means for establishing communications over WAN 529, such as network 531 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 6:
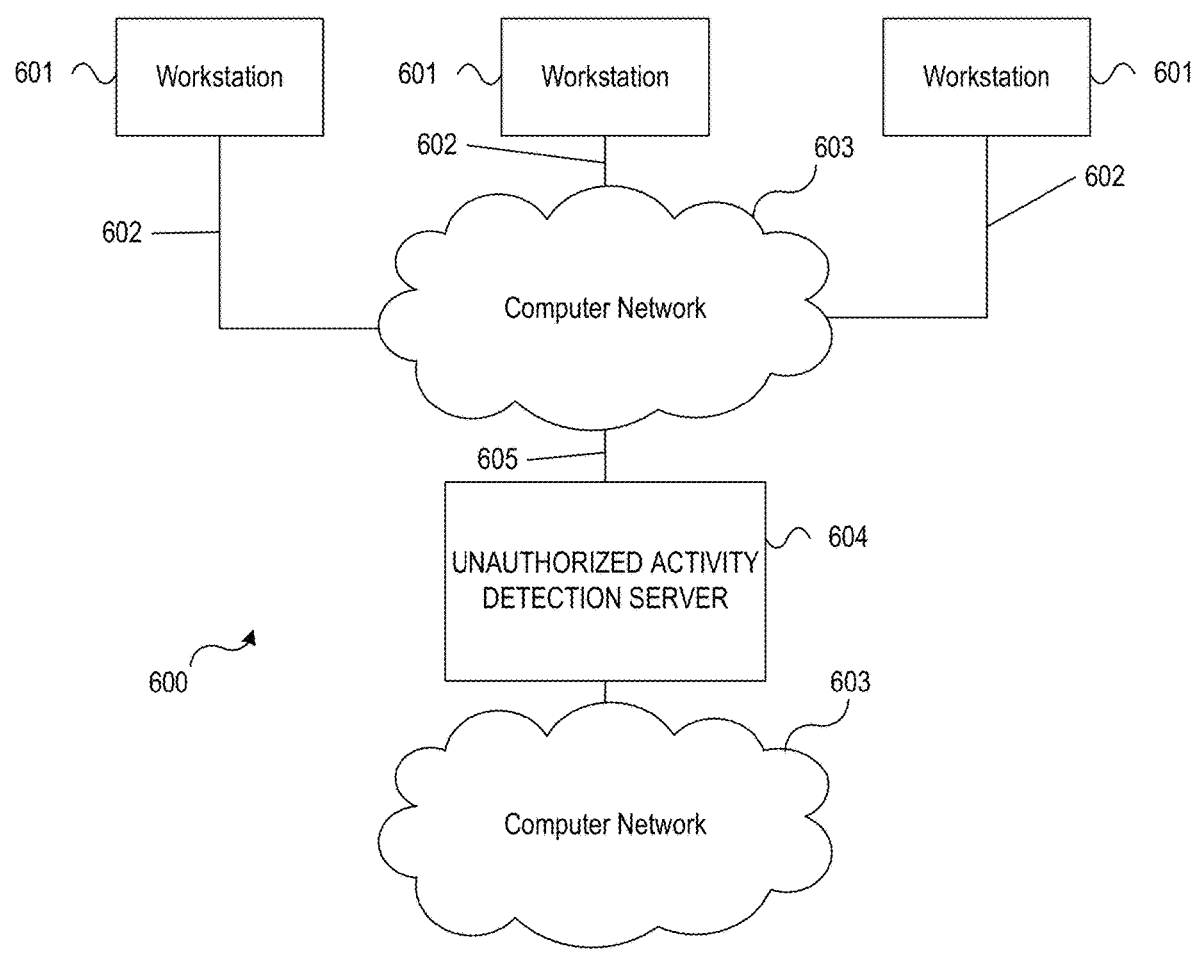
FIG. 6 depicts an illustrative block diagram of workstations and servers that may be used to implement the processes and functions of certain aspects of the present disclosure in accordance with one or more aspects described herein.

FIG. 6 depicts an illustrative block diagram of workstations and servers that may be used to implement the processes and functions of certain aspects of the present disclosure in accordance with one or more example embodiments. Referring to FIG. 6, illustrative system 600 may be used for implementing example embodiments according to the present disclosure. As illustrated, system 600 may include one or more workstation computers 601. Workstation 601 may be, for example, a desktop computer, a smartphone, a wireless device, a tablet computer, a laptop computer, and the like, configured to perform various processes described herein. Workstations 601 may be local or remote, and may be connected by one of communications links 602 to computer network 603 that is linked via communications link 605 to unauthorized activity detection server 604. In system 600, unauthorized activity detection server 604 may be a server, processor, computer, or data processing device, or combination of the same, configured to perform the functions and/or processes described herein. Server 604 may be used to generate machine learning datasets, generate client-specific or common issue rules, receive issue data, extract metadata, receive check and/or check image data, analyze the data using machine learning, generate an accept or reject decision, identify additional actions for execution, execute one or more actions, and the like.

Computer network 603 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 602 and 605 may be communications links suitable for communicating between workstations 601 and unauthorized activity detection server 604, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
   at least one processor;
   a communication interface communicatively coupled to the at least one processor; and
   a memory storing computer-readable instructions that, when executed by the at least one processor, cause the computing platform to:
   receive historical check data associated with authorized and unauthorized checks;
   train, using the historical check data, a machine learning model to identify patterns or sequences in data associated with one or more checks to determine whether a check of the one or more checks should be approved or rejected;
   generate, from the historical check data, one or more common issue rules, wherein the one or more common issue rules include a rule identifying an image flaw generated by an image capture device at a particular automated teller machine (ATM), wherein the image flaw includes a stray mark caused by the image capture device at the particular ATM;
   receive, from a customer computing system, issue data associated with a plurality of checks issued by a customer;
   extract, from the issue data, metadata associated with each check of the plurality of checks;
   receive one or more checks for reconciliation;
   scan the one or more checks for reconciliation to generate scanned images of the one or more checks for reconciliation;
   extract, from the images of the one or more checks for reconciliation and using optical character recognition, data from the one or more checks for reconciliation;
   analyze the data from the images of the one or more checks for reconciliation and the metadata associated with the each check of the plurality of checks to determine whether to approve or reject each check of the received one or more checks for reconciliation, wherein the analyzing includes:
       applying the one or more common issue rules; and
       executing the machine learning model to compare, using one or more machine learning datasets, the data from the images of the one or more checks for reconciliation to the metadata associated with the each check of the plurality of checks to determine whether to approve or reject the each check of the received one or more checks for reconciliation;
   responsive to determining to approve a first check of the received one or more checks for reconciliation, identify a first action to execute;
   responsive to determining to reject the first check of the received one or more checks for reconciliation, identify a second, different action to execute;
   execute one of the first action or the second action; and
   update the machine learning model based on the determination of whether to approve or reject the each check of the received one or more checks for reconciliation.

2. The computing platform of claim 1, wherein the first action includes automatically reconciling the first check.

3. The computing platform of claim 1, wherein the second action includes forwarding the first check for further analysis.

4. The computing platform of claim 1, wherein the issue data includes a data file including the metadata.

5. The computing platform of claim 1, further including instructions that, when executed by the at least one processor, cause the computing platform to:
   generate, based on previously received check data, one or more customer-specific rules for determining whether to approve or reject a check.

6. A method, comprising:
   receiving, by a computing platform having at least one processor and a memory and from a customer computing system, historical check data associated with authorized and unauthorized checks;
   training, by the at least one processor and using the historical check data, a machine learning model to identify patterns or sequences in data associated with one or more checks to determine whether a check of the one or more checks should be approved or rejected;
   generating, by the at least one processor and from the historical check data, one or more common issue rules, wherein the one or more common issue rules include a rule identifying an image flaw generated by an image capture device at a particular automated teller machine (ATM), wherein the image flaw includes a stray mark caused by the image capture device at the particular ATM;
   receiving, by the at least one processor and from the customer computing system, issue data associated with a plurality of checks issued by a customer;
   extracting, by the at least one processor and from the issue data, metadata associated with each check of the plurality of checks;
   receiving, by the at least one processor, one or more checks for reconciliation;
   scanning, by the at least one processor, the one or more checks for reconciliation to generate scanned images of the one or more checks for reconciliation;
   extracting, by the at least one processor and from the images of the one or more checks for reconciliation and using optical character recognition, data from the one or more checks for reconciliation;

analyzing, by the at least one processor, the data from the images of the one or more checks for reconciliation and the metadata associated with the each check of the plurality of checks to determine whether to approve or reject each check of the received one or more checks for reconciliation, wherein the analyzing includes:
applying the one or more common issue rules; and
executing, by the at least one processor, the machine learning model, to compare, using one or more machine learning datasets, the data from the images of the one or more checks for reconciliation to the metadata associated with the each check of the plurality of checks to determine whether to approve or reject the each check of the received one or more checks for reconciliation;
responsive to determining to approve a first check of the received one or more checks for reconciliation, identifying, by the at least one processor, a first action to execute;
responsive to determining to reject the first check of the received one or more checks for reconciliation, identifying, by the at least one processor, a second, different action to execute;
executing, by the at least one processor, one of the first action or the second action; and
updating, by the at least one processor, the machine learning model based on the determination of whether to approve or reject the each check of the received one or more checks for reconciliation.

7. The method of claim 6, wherein the first action includes automatically reconciling the first check.

8. The method of claim 6, wherein the second action includes forwarding the first check for further analysis.

9. The method of claim 6, wherein the issue data includes a data file including the metadata.

10. The method of claim 6, further including:
generating, by the at least one processor and based on previously received check data, one or more customer-specific rules for determining whether to approve or reject a check.

11. One or more non-transitory computer-readable media storing instructions that, when executed by a computing platform comprising at least one processor, a memory, and a communication interface, cause the computing platform to:
receive historical check data associated with authorized and unauthorized checks;
train, using the historical check data, a machine learning model to identify patterns or sequences in data associated with one or more checks to determine whether a check of the one or more checks should be approved or rejected;
generate, from the historical check data, one or more common issue rules, wherein the one or more common issue rules include a rule identifying an image flaw generated by an image capture device at a particular automated teller machine (ATM), wherein the image flaw includes a stray mark caused by the image capture device at the particular ATM;
receive, from a customer computing system, issue data associated with a plurality of checks issued by a customer;
extract, from the issue data, metadata associated with each check of the plurality of checks;
receive one or more checks for reconciliation;
scan the one or more checks for reconciliation to generate scanned images of the one or more checks for reconciliation;
extract, from the images of the one or more checks for reconciliation and using optical character recognition, data from the one or more checks for reconciliation;
analyze the data from the images of the one or more checks for reconciliation and the metadata associated with the each check of the plurality of checks to determine whether to approve or reject each check of the received one or more checks for reconciliation, wherein the analyzing includes:
applying the one or more common issue rules; and
executing the machine learning model to compare, using one or more machine learning datasets, the data from the images of the one or more checks for reconciliation to the metadata associated with the each check of the plurality of checks to determine whether to approve or reject the each check of the received one or more checks for reconciliation;
responsive to determining to approve a first check of the received one or more checks for reconciliation, identify a first action to execute;
responsive to determining to reject the first check of the received one or more checks for reconciliation, identify a second, different action to execute;
execute one of the first action or the second action; and
update the machine learning model based on the determination of whether to approve or reject the each check of the received one or more checks for reconciliation.

12. The one or more non-transitory computer-readable media of claim 11, wherein the first action includes automatically reconciling the first check.

13. The one or more non-transitory computer-readable media of claim 11, wherein the second action includes forwarding the first check for further analysis.

14. The one or more non-transitory computer-readable media of claim 11, wherein the issue data includes a data file including the metadata.

15. The one or more non-transitory computer-readable media of claim 11, further including instructions that, when executed by the at least one processor, cause the computing platform to:
generate, based on previously received check data, one or more customer-specific rules for determining whether to approve or reject a check.

* * * * *